United States Patent
Madduri et al.

(10) Patent No.: US 9,454,371 B2
(45) Date of Patent: Sep. 27, 2016

(54) MICRO-ARCHITECTURE FOR ELIMINATING MOV OPERATIONS

(71) Applicants: Venkateswara Madduri, Austin, TX (US); Jonathan Combs, Austin, TX (US); James E. Phillips, Round Rock, TX (US); Stephen J. Robinson, Austin, TX (US); James D. Allen, Austin, TX (US); Jonathan J. Tyler, Austin, TX (US)

(72) Inventors: Venkateswara Madduri, Austin, TX (US); Jonathan Combs, Austin, TX (US); James E. Phillips, Round Rock, TX (US); Stephen J. Robinson, Austin, TX (US); James D. Allen, Austin, TX (US); Jonathan J. Tyler, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 13/977,064

(22) PCT Filed: Oct. 4, 2012

(86) PCT No.: PCT/US2012/058722
§ 371 (c)(1),
(2) Date: Jan. 23, 2014

(87) PCT Pub. No.: WO2013/101323
PCT Pub. Date: Jul. 4, 2013

(65) Prior Publication Data
US 2014/0068230 A1    Mar. 6, 2014

Related U.S. Application Data

(63) Continuation of application No. PCT/US2011/068083, filed on Dec. 30, 2011.

(51) Int. Cl.
*G06F 9/315* (2006.01)
*G06F 9/30* (2006.01)
*G06F 9/38* (2006.01)

(52) U.S. Cl.
CPC ....... *G06F 9/30145* (2013.01); *G06F 9/30032* (2013.01); *G06F 9/384* (2013.01); *G06F 9/3838* (2013.01); *G06F 9/3857* (2013.01)

(58) Field of Classification Search
None
See application file for complete search history.

(56) References Cited

U.S. PATENT DOCUMENTS 6,256,721 B1    7/2001  Witt
6,505,293 B1 *  1/2003  Jourdan .............. G06F 9/30032
                                              712/216

(Continued)

FOREIGN PATENT DOCUMENTS

TW          200907694 A       2/2009

OTHER PUBLICATIONS

International Search Report and Written Opinion issued on Apr. 30, 2012, for the counterpart International Application No. PCT/US2011/068083.

(Continued)

*Primary Examiner* — Jacob A Petranek
(74) *Attorney, Agent, or Firm* — Kenyon & Kenyon LLP

(57) ABSTRACT

A computer system and processor for elimination of move operations include circuits that obtain a computer instruction and bypass execution units in response to determining that the instruction includes a move operation that involves a transfer of data from a logical source register to a logical destination register. Instead of executing the move operation, the transfer of the data is performed by tracking changes in data dependencies of the source and the destination registers, and assigning a physical register associated with the source register to the destination register based on the dependencies.

25 Claims, 15 Drawing Sheets

(56) References Cited

U.S. PATENT DOCUMENTS

| | | | |
|---|---|---|---|
| 7,406,587 B1 | 7/2008 | Zhang et al. | |
| 7,434,031 B1 | 10/2008 | Spracklen et al. | |
| 2005/0138339 A1* | 6/2005 | Hily | G06F 9/3834 |
| | | | 712/225 |
| 2007/0043932 A1* | 2/2007 | Kulkarni | G06F 9/3836 |
| | | | 712/214 |
| 2007/0101103 A1 | 5/2007 | Nguyen et al. | |
| 2009/0030960 A1 | 1/2009 | Geraghty et al. | |
| 2009/0055631 A1 | 2/2009 | Burky et al. | |
| 2009/0063823 A1* | 3/2009 | Burky | G06F 9/3838 |
| | | | 712/216 |
| 2009/0327661 A1* | 12/2009 | Sperber | G06F 9/30098 |
| | | | 712/217 |
| 2010/0161948 A1 | 6/2010 | Abdallah | |
| 2011/0219208 A1 | 9/2011 | Asaad et al. | |
| 2012/0005459 A1* | 1/2012 | Fleischman | G06F 9/30032 |
| | | | 712/216 |

OTHER PUBLICATIONS

International Search Report and Written Opinion issued on Dec. 6, 2012, for the counterpart International Continuation Application No. PCT/US2012/58722.

Office Action with Taiwan IPO Search Report issued in TW Appln. No. 101148743, dated Sep. 23, 2014, 18 pages (with English translation).

* cited by examiner mov eax, 20h; Vector[4:0] = 5 b0_0000 ; New PDst = 9; Reclaim = 14

MOVE Elimination Table

| LDest | eax | ebx | ecx | edx |
|---|---|---|---|---|
| eax | 0 | 0 | 0 | 0 |
| ebx | 0 | 0 | 0 | 0 |
| ecx | 0 | 0 | 0 | 0 |
| edx | 0 | 0 | 0 | 0 |

RAT Table

| LDest | New PDST | Old PDst |
|---|---|---|
| eax | 9 | 14->9 |
| ebx | 34 | 62 |
| ecx | 45 | 17 |
| edx | 56 | 37 |

FIG. 7A mov ebx, eax; Vector[4:0] = 5 b1_0000 ; New PDst = 9; Reclaim = 62

MOVE Elimination Table

| LDEST | eax | ebx | ecx | edx |
|---|---|---|---|---|
| eax | 0 | 1 | 0 | 0 |
| ebx | 1 | 0 | 0 | 0 |
| ecx | 0 | 0 | 0 | 0 |
| edx | 0 | 0 | 0 | 0 |

RAT Table

| LDEST | New PDST | Old PDst |
|---|---|---|
| eax | 9 | 9 |
| ebx | 9 | 62->9 |
| ecx | 45 | 17 |
| edx | 56 | 37 |

FIG. 7B mov ecx, ebx; Vector[4:0] = '5 b1_0001 ; New PDst = 9; Reclaim = 17

MOVE Elimination Table

| LDEST | eax | ebx | ecx | edx |
|---|---|---|---|---|
| eax | 0 | 1 | 1 | 0 |
| ebx | 1 | 0 | 1 | 0 |
| ecx | 1 | 1 | 0 | 0 |
| edx | 0 | 0 | 0 | 0 |

RAT Table

| LDEST | New PDST | Old PDst |
|---|---|---|
| eax | 9 | 9 |
| ebx | 9 | 9 |
| ecx | 9 | 17->9 |
| edx | 56 | 37 |

FIG. 7C mov eax, 0x40h; Vector[4:0] = 5'b0_0000 ; New PDst = 41; Donot Reclaim Marble MOVE Elimination Table

| LDEST | eax | ebx | ecx | edx |
|-------|-----|-----|-----|-----|
| eax   | 0   | 0   | 0   | 0   |
| ebx   | 0   | 0   | 1   | 0   |
| ecx   | 0   | 1   | 0   | 0   |
| edx   | 0   | 0   | 0   | 0   |

RAT Table

| LDEST | New PDST | Old PDst |
|-------|----------|----------|
| eax   | 41       | 9 -> 41  |
| ebx   | 9        | 9        |
| ecx   | 9        | 9        |
| edx   | 56       | 37       |

FIG. 7D mov ecx, eax; Vector[4:0] = 5   b1_0000 ; New PDst = 41;   Donot Reclaim Marble MOVE Elimination Table

| LDEST | eax | ebx | ecx | edx |
|-------|-----|-----|-----|-----|
| eax   | 0   | 0   | 1   | 0   |
| ebx   | 0   | 0   | 0   | 0   |
| ecx   | 1   | 0   | 0   | 0   |
| edx   | 0   | 0   | 0   | 0   |

RAT Table

| LDEST | New PDST | Old PDst |
|-------|----------|----------|
| eax   | 41       | 41       |
| ebx   | 9        | 9        |
| ecx   | 41       | 9 -> 41  |
| edx   | 56       | 37       |

FIG. 7E mov edx, ebx; Vector[4:0] =5 b1_0001 ; New PDst = 9; Reclaim Marble=37

MOVE Elimination Table

| LDEST | eax | ebx | ecx | edx |
|-------|-----|-----|-----|-----|
| eax   | 0   | 0   | 1   | 0   |
| ebx   | 0   | 0   | 0   | 1   |
| ecx   | 1   | 0   | 0   | 0   |
| edx   | 0   | 1   | 0   | 0   |

RAT Table

| LDEST | New PDST | Old PDst |
|-------|----------|----------|
| eax   | 41       | 41       |
| ebx   | 9        | 9        |
| ecx   | 41       | 41       |
| edx   | 9        | 37->9    |

FIG. 7F mov ebx , 0x30h; Vector[4:0] ='5b0_0000 ; NewPDst = 32; Donot Reclaim Marble MOVE Elimination Table

| LDEST | eax | ebx | ecx | edx |
|---|---|---|---|---|
| eax | 0 | 0 | 1 | 0 |
| ebx | 0 | 0 | 0 | 0 |
| ecx | 1 | 0 | 0 | 0 |
| edx | 0 | 0 | 0 | 0 |

RAT Table

| LDEST | New PDST | Old PDst |
|---|---|---|
| eax | 41 | 41 |
| ebx | 32 | 9 -> 32 |
| ecx | 41 | 41 |
| edx | 9 | 9 |

MICRO-ARCHITECTURE FOR ELIMINATING MOV OPERATIONS

BACKGROUND INFORMATION

Computer systems often include the capability of performing out-of-order execution of instructions. Instead of executing instructions sequentially, the instructions may be analyzed for data dependencies so that instructions that do not share data dependencies can be executed in parallel via a set of pipelines. The instructions are typically fetched, decoded into micro operations, and placed into a queue from which the operations are executed.

To facilitate out-of-order execution, computer systems may include a register renaming feature, whereby data (instruction operands and instruction results) are held in a set of physical registers, which are dynamically mapped to a corresponding set of architectural (logical) registers specified by the instruction set architecture (ISA) used by the system. Register renaming aims to remove false data dependencies by renaming the physical registers associated with operations that are not truly data dependent, so that falsely dependent operations can be executed in parallel.

Renaming also facilitates speculative execution, in which operations are tentatively executed and later committed depending on whether the result of a branch operation from which the speculatively executed operations depend was successfully predicted. The results of these speculatively executed operations may be placed in renamed registers until the operations are ready to be committed.

Renaming does not prevent operations from being executed. For example, move (MOV) operations, in which data is moved from a logical source register to a logical destination register, are still placed in the queue and issued to execution units for execution. Thus, conventional out-of-order execution techniques treat MOV operations as normal operations.

BRIEF DESCRIPTION OF THE DRAWINGS

FIGS. 7A to 7G show an example of how a Move elimination matrix and a renaming table are updated to provide MOV elimination in accordance with example embodiments of the present invention.

DETAILED DESCRIPTION OF EXAMPLE EMBODIMENTS

The present invention relates to computer architectures that perform out of order execution of instructions that include MOV operations.

Figure 1:
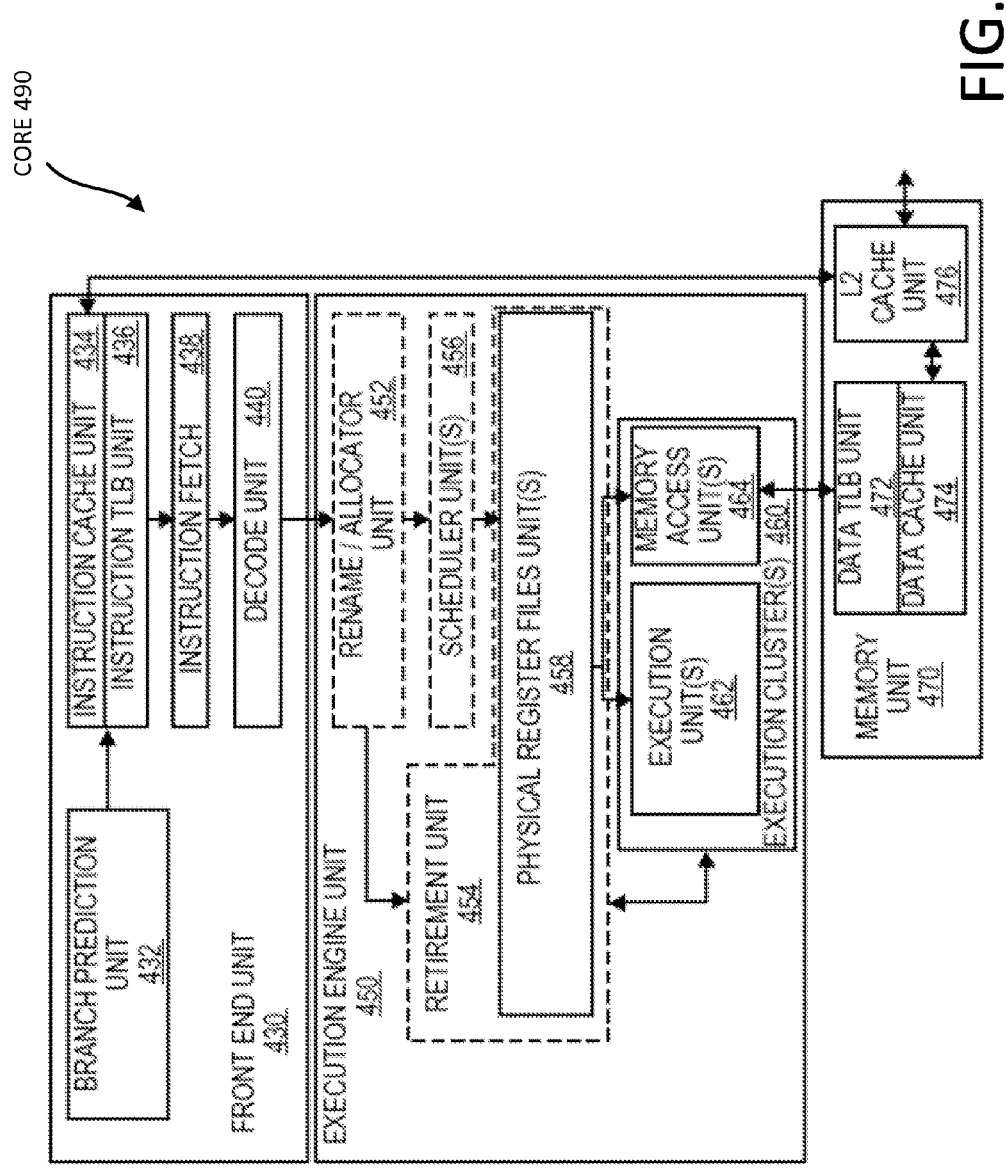
FIG. 1 is a block diagram illustrating an in-order architecture core and a register renaming logic, out-of-order issue/execution logic to be included in a processor according to an example embodiment of the present invention.

FIG. 1 is a block diagram illustrating an in-order architecture core and a register renaming logic, out-of-order issue/execution logic to be included in a processor according to an example embodiment of the present invention.

In FIG. 1, arrows denote a coupling between two or more units and the direction of the arrow indicates a direction of data flow between those units. FIG. 1 shows a processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
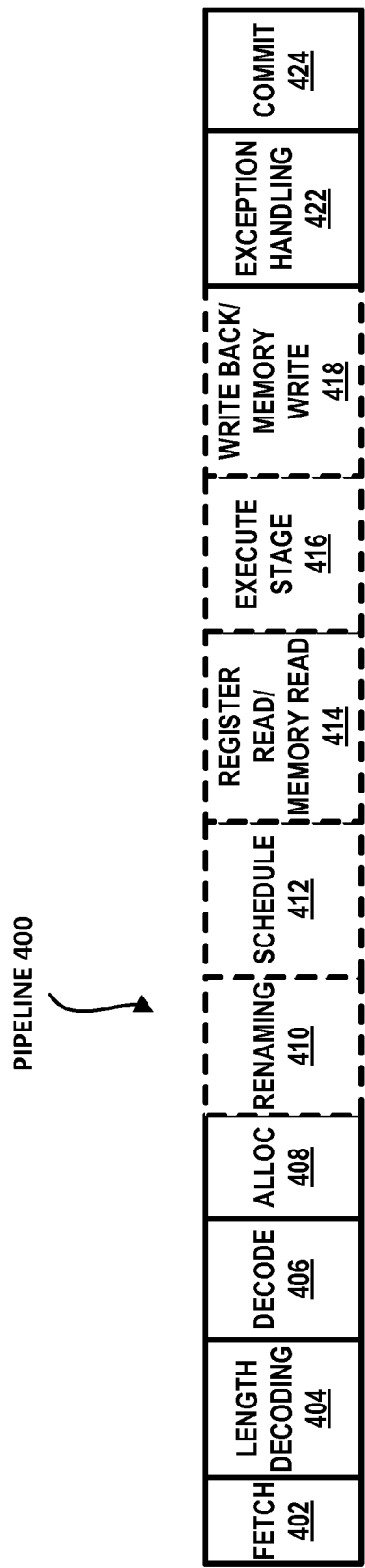
FIG. 2 is a block diagram illustrating an in-order pipeline and a register renaming stage, out-of-order issue/execution pipeline according to an example embodiment of the present invention.

FIG. 2 is a block diagram illustrating an in-order pipeline and a register renaming stage, out-of-order issue/execution pipeline according to an example embodiment of the present invention. In FIG. 2, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. The solid lined boxes in FIG. 2 illustrate the in-order pipeline, while the dashed lined boxes illustrates the register renaming portion of the in-order pipeline (renaming is also in-order) and the out-of-order issue/execution pipeline. Similarly, the solid lined boxes in FIG. 1 illustrate the in-order architecture logic, while the dashed lined boxes illustrates the register renaming logic and out-of-order issue/execution logic.

Figure 3:
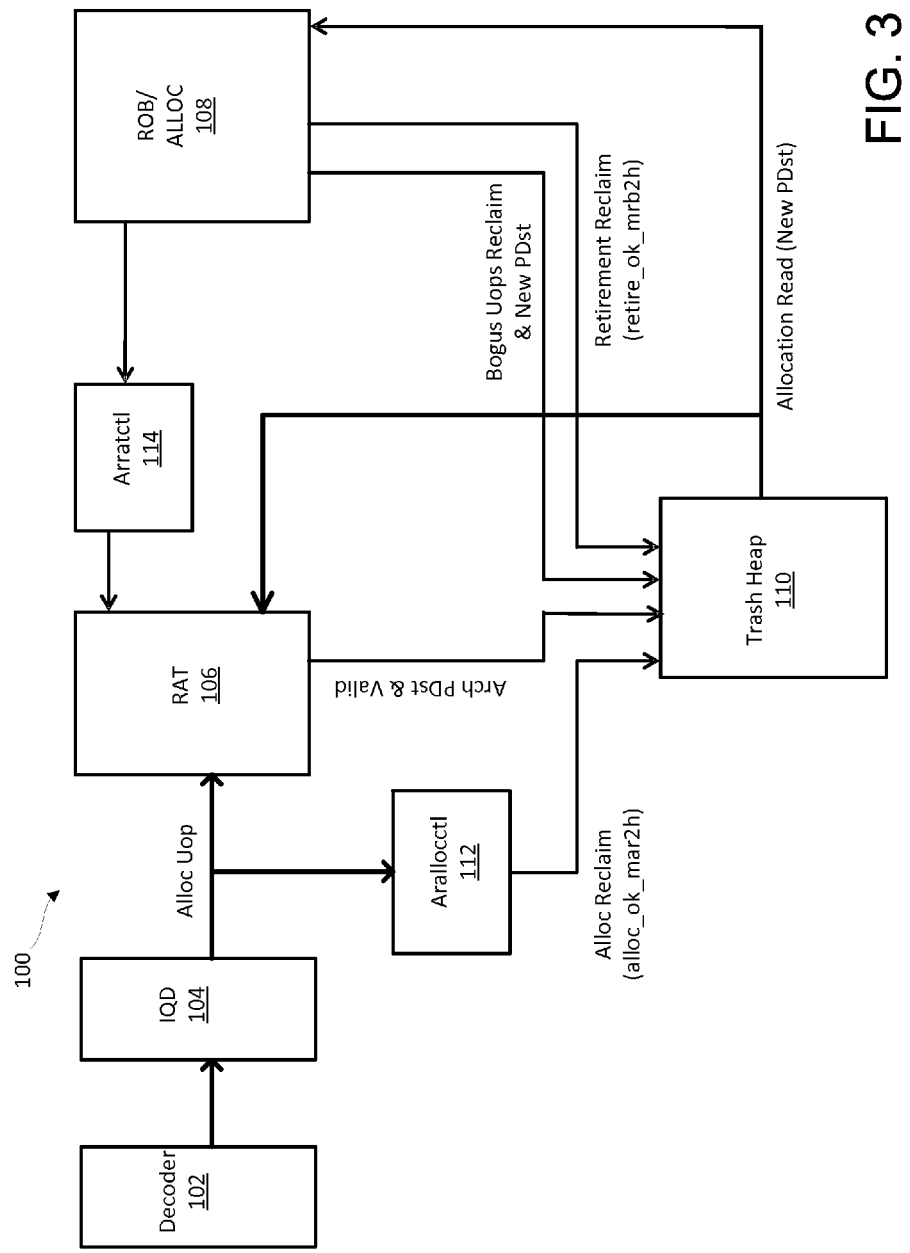
FIG. 3 is a block diagram of a circuit arrangement for MOV elimination in accordance with an example embodiment of the present invention.

FIG. 3 is a block diagram of a circuit arrangement 100 for MOV elimination in accordance with an example embodiment of the present invention. The circuit 100 may be integrated into a processor or as a standalone circuit in a system that includes a processor. The circuit 100 may include an instruction decoder 102, an operation queue (IQD) 104, a renaming table (RAT) 106, a reorder buffer/allocator unit (ROB/ALLOC) 108, a trash heap 110, a first control unit (arallocctl) 112 and a second control unit (arratctl) 114.

The instruction decoder 102 may operate in substantially the same manner as the decoder 228 in FIG. 1. The decoder 102 may translate macro instructions into uops that are then written into the instruction queue 104.

The IQD 104 may be similar to the uop queue 234 previously described and stores the uops for execution.

The circuit 100 may include a MOV detection unit (not shown) that determines whether MOV operations meet certain elimination criteria (discussed below). The MOV detection unit may be located anywhere before the rename point of the circuitry. In one embodiment, detection may occur in the front end, e.g., with the MOV detection unit being integrated into the decoder 102. In another embodiment, detection may be performed after instruction decode by the execution unit. Alternatively, the MOV detection unit may be a stand-alone unit within the circuit 100.

The RAT 106 may include column entries that correspond to a logical destination (LDest) of uops, an old physical destination (PDST) and a new PDST. The PDST entries are used to keep track of changes in the physical registers pointed to by each MOV operation in response to register renaming. Each uop read from the IQD 104 is assigned a token (hereinafter referred to as a "marble"), which is recorded into a RAT entry assigned to the destination register of the uop. Marble IDs in the RAT entries are pointers to the locations in the PRF where the contents of the physical registers are stored. Marbles in the RAT 106 may refer to both architectural states and speculative states of the logical registers. When a uop is speculatively executed, a marble in a New PDST entry may be assigned to the uop's destination register, replacing a marble in the destination register's old PDST entry (alternatively referred to herein as an Arch PDST). Thus, the New PDST entry is a pointer to a speculative copy of the uop's results and the old PDST entry is a pointer to an architectural copy of the results. As explained below, when the uop retires (e.g., when the speculative execution is successful), the old PDST entry may be synchronized with the New PDST entry to update the architectural state of the uop. Additionally, the RAT 106 may include an Arch Valid bit that indicates whether subsequent uops should reference the speculative copy of the results (New PDST) or reference the architectural copy (Old PDST). For example, an Arch Valid bit of 1 may indicate the use of Old PDST while an Arch Valid bit of 0 may indicate the use of New PDST. Whenever the pipeline is flushed, the Arch Valid bits is set to 1. Subsequently, the Arch Valid bits is reset to 0 whenever a uop with a corresponding destination register is allocated from the IDQ 104.

The trash heap 110 may include a set of available marbles that are assignable to newly allocated uops. The marbles may be assigned at random. When a uop retires, the marble assigned to the retiring uop may be reclaimed if no other uops currently reference the same marble. Reclaimed marbles are returned to the trash heap 110.

The circuit 100 may track dependencies, in part by using a vector whose values are determined at the time of allocation and which identifies a source register. Each logical register may be assigned an identifier which, when included in the vector, indicates that the logical destination shares a dependency with the identified source register. The following table is a list of identifiers for a set of sixteen registers:

| |
|---|
| [0000] - RAX |
| [0001] - RBX |
| [0010] - RCX |
| [0011] - RDX |
| [0100] - RSI |
| [0101] - RDI |
| [0110] - RSP |
| [0111] - RBP |
| [1000] - R8 |
| [1001] - R9 |
| [1010] - R10 |
| [1011] - R11 |
| [1100] - R12 |
| [1101] - R13 |
| [1110] - R14 |
| [1111] - R15 |

The number of bits in each identifier may vary depending on how many logical registers there are in the system. In this example, there are sixteen registers, requiring four bits, and the eax register is assigned [0001] so that the operation mov eax, ebx (move from ebx into eax) results in [1_0001] being assigned to the vector. The additional fifth bit that precedes the 4-bit identifier is used as a valid bit to flag operations for elimination. When the additional bit is 1, this indicates that the operation should be eliminated. When the additional bit is 0, this indicates that the operation cannot be eliminated. The vector is then stored in an allocation array contained in the ROB/ALLOC 108. In an alternative embodiment, the additional bit may not be included in the vector, but may be recorded elsewhere and linked to the uop.

The ROB/ALLOC 108 may be similar to the rename/allocator unit 452 and maintains an ordered list of operations and their associated data (e.g., speculative results) prior to commitment and retirement. The ROB/ALLOC 108 may include an allocation (ALLOC) array. The ALLOC array may implement features of conventional allocation arrays. Additionally, the ALLOC array may be used as a convenient location for storing the allocation vector described above.

The ROB/ALLOC 108 may also include a dependency table (referred to herein as a Move elimination (ME) matrix) that tracks dependencies of uops. The ME matrix may include entries that indicate the dependencies between source and destination registers. In one embodiment, each row of the ME matrix is assigned to a different logical register and the row forms a vector that shows the dependencies between the assigned register and the remaining logical registers. The ME matrix may be initialized to all zeroes to indicate that there are no dependencies. The columns of the ME matrix may be assigned to logical registers in the same respective order as the rows, and the ME matrix may be symmetric, e.g., along a diagonal from top left to bottom right.

At the time of retirement, the row of the ME matrix corresponding to the destination register is updated based on the allocation vector in the ALLOC array. This may be performed by using the allocation vector to identify the source register in order to read out the ME matrix entries of the source register. The read-out entries can then be combined (e.g., using a logical OR operation) with a vector that indicates the current dependency between the source and destination registers. The resulting ORed vector is then written to the row and column corresponding to the destination register. In this manner, the ME matrix is updated to reflect the latest dependencies (e.g., the current dependency between the destination register and the source register, plus any existing dependencies of the source register). As will be explained, MOV elimination in accordance with embodiments of the present invention involves updating the New PDST entries of the RAT 106 during allocation in addition to updating the old PDST entries and Arch Valid bits during retirement. In this manner, the pointers to the destination registers (i.e., New PDST and/or Old PDST) will always point to the physical registers currently assigned to the source registers. Thus, MOV operations need not be executed and the execution units may be bypassed.

Additionally, when a uop is ready to retire, the ME matrix may be checked to determine whether the marble assigned to the Old PDST of the retiring uop can be reclaimed. This determination may be performed by looking up the row or column corresponding to the destination register of the retiring uop. If the row and/or column entries are all zero, then the destination register has no dependencies and the marble assigned to this instruction can be reclaimed (made available for assigning to a subsequent instruction) by updating the RAT 106. If there is a non-zero entry, the marble is not reclaimed. The determination of whether the marble can be reclaimed may be performed prior to updating the ME matrix, so that the current dependency indicated by the allocation vector (i.e., between the source and destination registers of the current uop) is not considered in determining whether to release the marble.

MOV elimination may be conditioned on the requirement that (a) the MOV is a register-to-register operation, and (b) the operand size (Osize) of the source and destination registers are the same as each other and the same as the operating mode of the system itself. For example:

In 64-bit mode, the Osize of both the source and destination registers in the MOV operation must be 64 bits (Osize64); and In 32-bit mode, Osize of both the source and destination registers must be 32 bits.

The condition that the operand sizes be the same prevents the possibility of reading or writing incorrect data. If operand sizes are different, partial writes may occur in which only a portion of a register (e.g., 8 bits of a 32-bit register) are written to. This may require keeping track of each writable segment of the register, rather than tracking the register as a whole. For illustration purposes, the exemplary embodiments of the present invention are described herein with respect to the simpler scenario in which the entire register is tracked. However, it will be understood that the various embodiments may be readily adapted so as not to require the operands to be the same size (e.g., with appropriate modifications to the ROB and ME matrix to include additional logical states that track dependencies of partial registers).

When the MOV operation involves an immediate (e.g., mov eax, 50h stores the hexadecimal value 50h into eax), the MOV operation may not be eliminated, since there is no existing pointer to a source register. Accordingly, the allocation vector in the ALLOC array is assigned a value of all zeroes (e.g., 0_0000). The preceding bit equal to 0 indicates that the MOV operation will not be eliminated, while the trailing four bits indicate that there are no new dependencies incurred by the operation.

Arallocctl 112 is a control unit that determines, at the time of allocation, whether a marble previously assigned to a uop can be reclaimed, and if so, identifies the reclaimed marble to the trash heap.

Arratctl 114 is a control unit that determines, at the time of retirement, whether a marble previously assigned to a uop can be reclaimed. This may include the determination previously described, in which the ME matrix is checked for non-zero entries in the row/column of the destination register.

Figure 4:
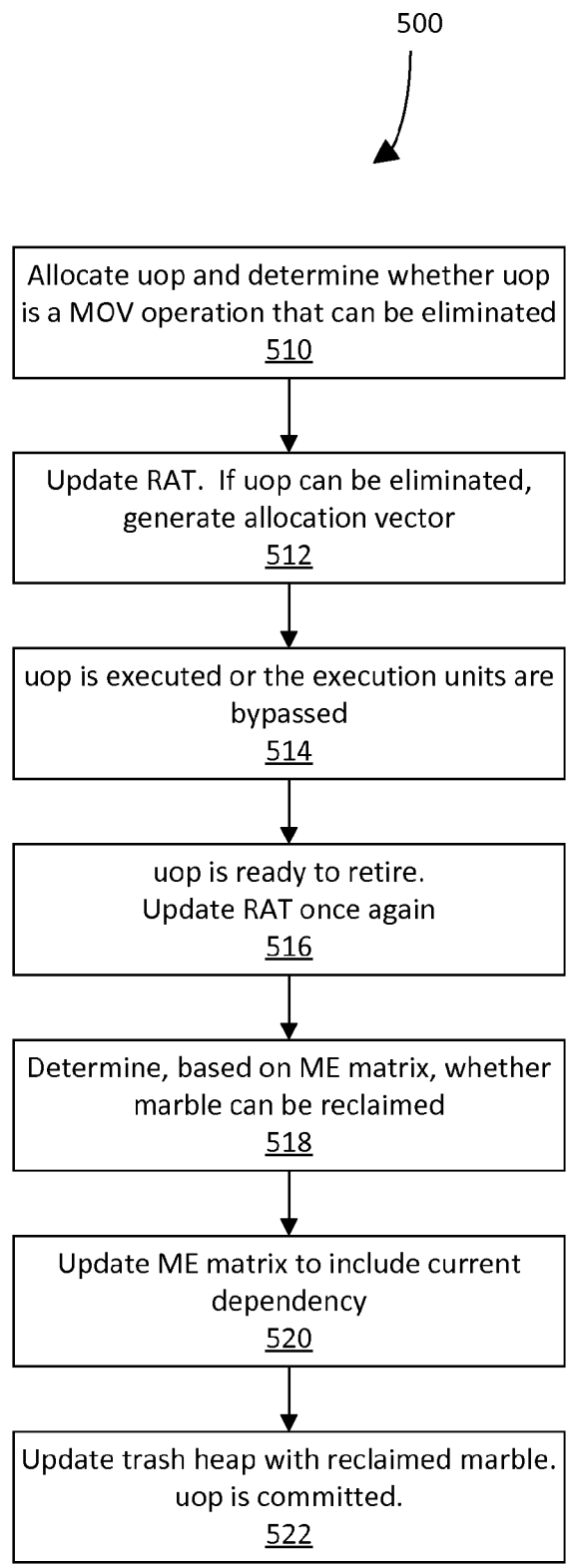
FIG. 4 is a flow chart of a method for MOV elimination according to an example embodiment of the present invention.

FIG. 4 is a flow chart of a method 500 for MOV elimination according to an example embodiment of the present invention. The method 500 may be performed using the circuit 100 of FIG. 3.

In 510, a uop corresponding to a decoded instruction is obtained, e.g., from the decoder 102. The uop is placed in the IQD 104 and subsequently allocated. Sometime after allocation, but before renaming, a determination is made whether the uop is a MOV operation that can be eliminated. As previously discussed, this determination may be performed by a MOV detection unit that determines whether a MOV operation meets certain requirements including, e.g., register-to-register operation.

In 512, the RAT 106 is updated. If the destination register does not depend on any existing registers, a new marble may be assigned at random from the trash heap 110. The new marble is written to the New PDST entry of the destination register. However, if a dependency exists, then the New PDST entry is assigned the same marble as that of the source register. The Arch Valid bit is reset to 0 to indicate that the speculative copy should be used by subsequent uops. If the MOV operation can be eliminated, the Alloc array vector is generated with the flag set to 1 and the remaining bits identifying the source register. The RAT 106 then passes the New PDST and the vector to the ALLOC array.

In 514, the uop is executed or, if MOV elimination was indicated, the execution units are bypassed and the uop is sent directly to the ROB/ALLOC 108.

In 516, the uop is ready to retire. If the Arch Valid bit was set to 0, the ALLOC array may pass the New PDST entry back to the ROB 106 so that the Old PDST entry can be updated with the New PDST. Whenever the pipeline is flushed due to a mispredicted branch or exception the Arch Valid bit is then set back to 1 to indicate that subsequent uops may now refer to the architectural copy.

In 518, the arratctl 114 may determine, based on the ME matrix entries of the destination register, whether the marble assigned to the Old PDST entry can be reclaimed.

In 520, the ROB/ALLOC 108 updates the ME matrix to combine the current dependency between the source and the destination registers with the existing dependencies of the source register. The result is written to the row and column in the ME matrix that corresponds to the destination register. The uop is then retired.

In 522, the trash heap 110 is updated with any reclaimed marbles. The uop is then committed (assuming no exceptions have occurred) and the now the result in the physical destination register in the PRF is no-longer speculative.

Figure 5:
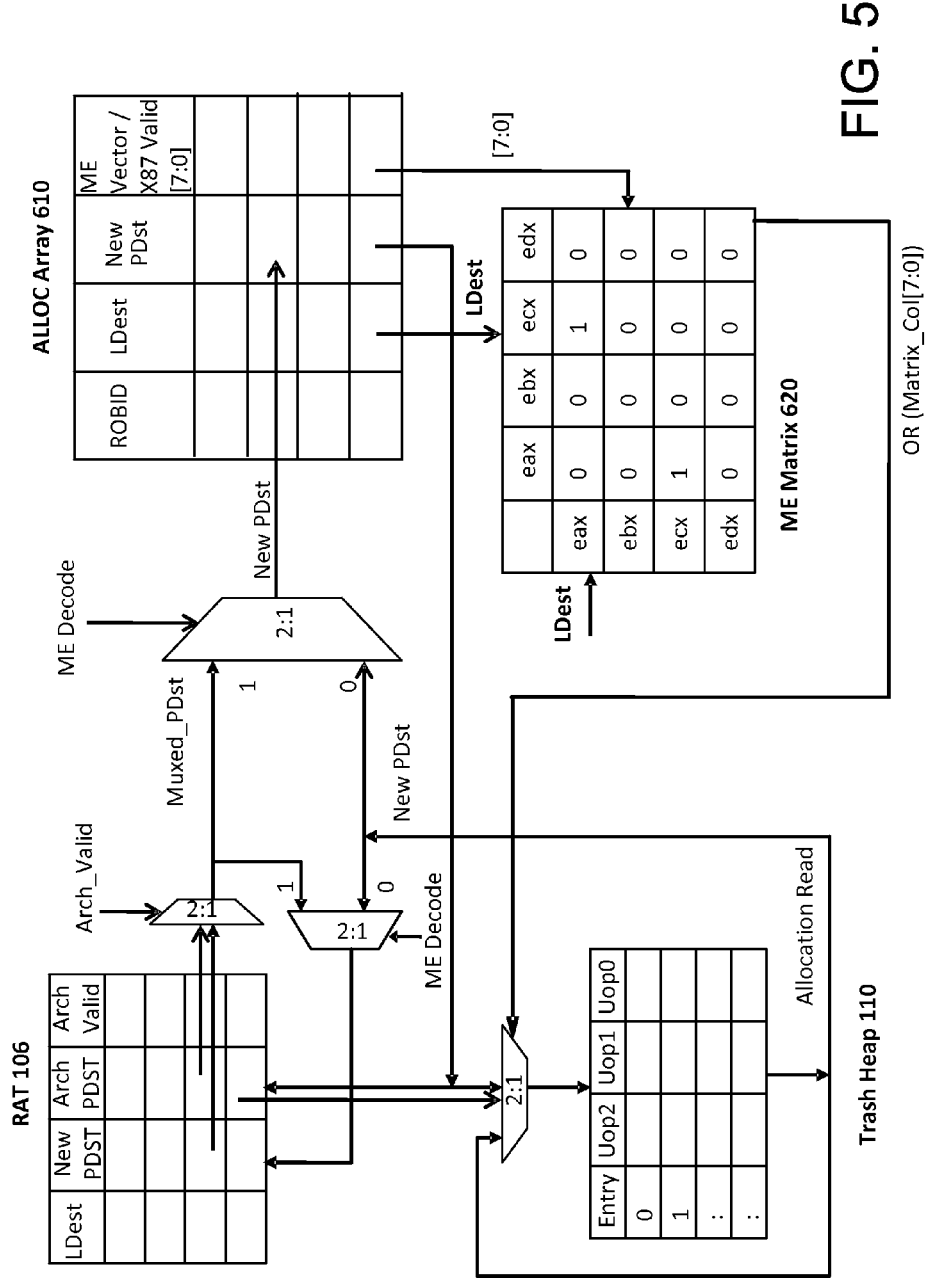
FIG. 5 is a detailed block diagram illustrating the flow of data between the various components of the circuit of FIG. 3.

FIG. 5 is a detailed block diagram illustrating the flow of data between the various components of the circuit 100. As shown, during allocation either the New PDST or the Old (Arch) PDST is selected and forwarded as a Muxed_PDST entry based on the Arch Valid bit. The Muxed_PDST is then muxed with a New PDST entry selected from the trash heap based on an ME Decode signal, which indicates whether a new marble was selected from the trash heap 110. The ME Decode signal is generated based on a determination of whether the MOV elimination conditions described above are satisfied. If the conditions are satisfied, then Muxed_PDST is selected for output, otherwise New PDST is selected. The result of this latter muxing provides the correct value of the New PDST entry, which may be written back to the RAT 106 as well as forwarded to the ALLOC array 610.

At retirement, the New PDst is also written back to the RAT 106 from the ALLOC array 610. The ME matrix values of the row and/or column of the destination register are then used to determine whether to reclaim the marble.

Also at retirement, the allocation vector (shown in this example as an 8-bit vector), is used to update the rows and columns in the ME matrix 620 that correspond to the destination register (LDest).

Figure 6:
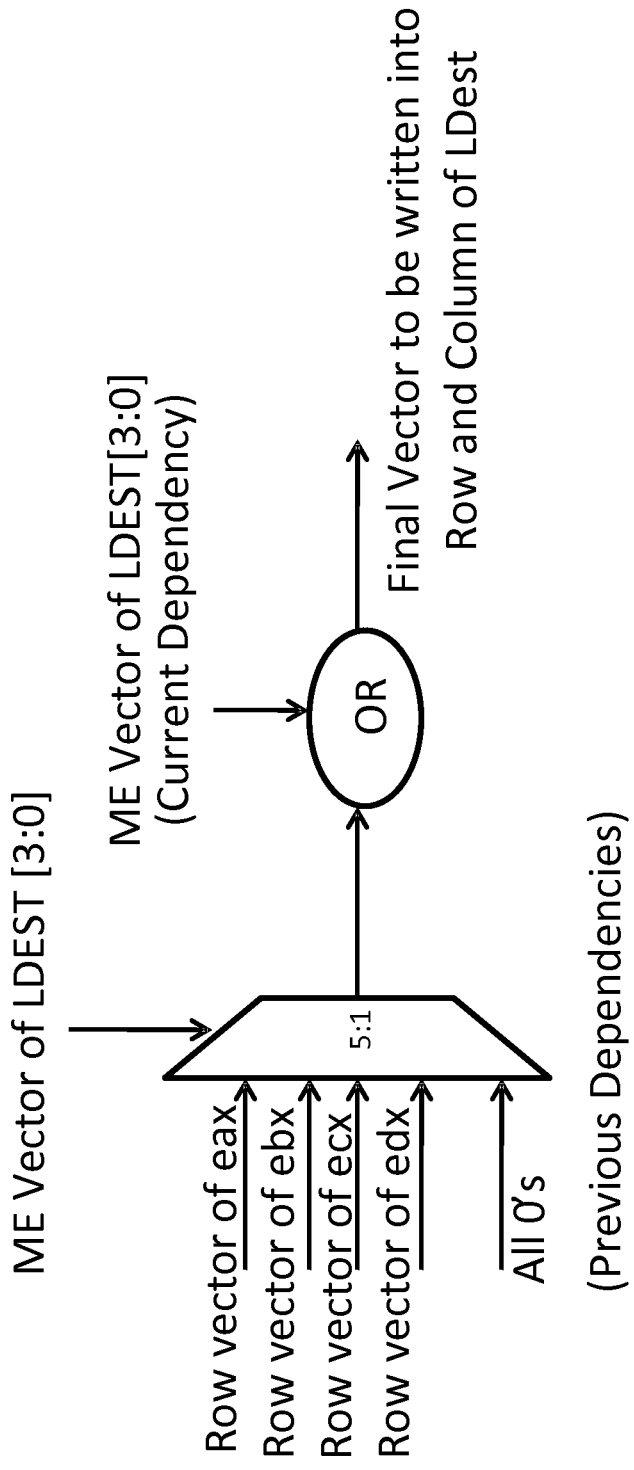
FIG. 6 is a schematic of a circuit arrangement for updating a Move elimination matrix in accordance with an example embodiment of the present invention.

FIG. 6 is a schematic of a circuit arrangement for updating the ME matrix by combining the current dependency (between the destination register and the source register identified by the allocation vector) with the existing ME matrix entries of the source register. The row of the ME matrix corresponding to the source register is muxed out and logically ORed with the current dependency between the source and the destination registers. The resulting vector is then written into the row and column of the destination register.

FIGS. 7A to 7G show an example of how the ME table and RAT are updated to provide MOV elimination in accordance with example embodiments of the present invention. For illustration purposes, the Arch Valid bit previously described has been omitted. In FIG. 7A, the ME table is initially set to all zeroes. In response to the allocation of the uop move eax, 20h (which copies the hexadecimal value 20h into eax), a new marble (9) is assigned to the New PDST of the eax register. At retirement, the Old PDST is updated from 14 to 9 and the marble 14 is reclaimed since no other registers (ebx/ecx/edx) depend on 14. The rows and columns in the ME matrix corresponding to eax are updated with the vector [0000] since this operation involves an immediate In FIG. 7B, the uop move ebx, eax is allocated. At retirement, the Old PDST of ebx is updated from 62 to 9 and the marble 62 is reclaimed. The rows and columns in the ME matrix corresponding to ebx are updated with the vector [1000] (based on ORing 1000 with 0000) to indicate the dependency with eax.

In FIG. 7C, the uop move ecx, ebx is allocated. At retirement, the Old PDST of ecx is updated from 17 to 9 and the marble 17 is reclaimed. The rows and columns in the ME matrix corresponding to ebx are updated with the vector [1100] (based on ORing 0100 with 1000) to indicate the dependency with ebx.

In FIG. 7D, the uop move eax, 0x40h is allocated. A new marble (41) is assigned to the New PDST of the eax register. At retirement, the Old PDST of eax is updated from 9 to 41. Because the rows and columns of eax include a non-zero entry (see FIG. 7C), the marble 9 cannot be reclaimed. The rows and columns in the ME matrix corresponding to eax are updated with the vector [0000] since this operation involves an immediate.

FIG. 7E, the uop move ecx, eax is allocated. At retirement, the Old PDST of ecx is updated from 9 to 41. Because the rows and columns of ecx include a non-zero entry (see FIG. 7D), the marble 9 cannot be reclaimed. The rows and columns in the ME matrix corresponding to ecx are updated with the vector [1000] (based on ORing 1000 with 0000) to indicate the dependency with eax.

FIG. 7F, the uop move edx, ebx is allocated. At retirement, the Old PDST of edx is updated from 37 to 9 and the marble 37 is reclaimed. The rows and columns in the ME matrix corresponding to edx are updated with the vector [0100] (based on ORing 0100 with 0000) to indicate the dependency with ebx.

FIG. 7G, the uop move ebx, 0x30h is allocated. A new marble (32) is assigned to the New PDST of the ebx register. At retirement, the Old PDST of ebx is updated from 9 to 32. Because the rows and columns of ebx include a non-zero entry (see FIG. 7F), the marble 9 cannot be reclaimed. The rows and columns in the ME matrix corresponding to ebx are updated with the vector [0000] since this operation involves an immediate.

Figure 8:
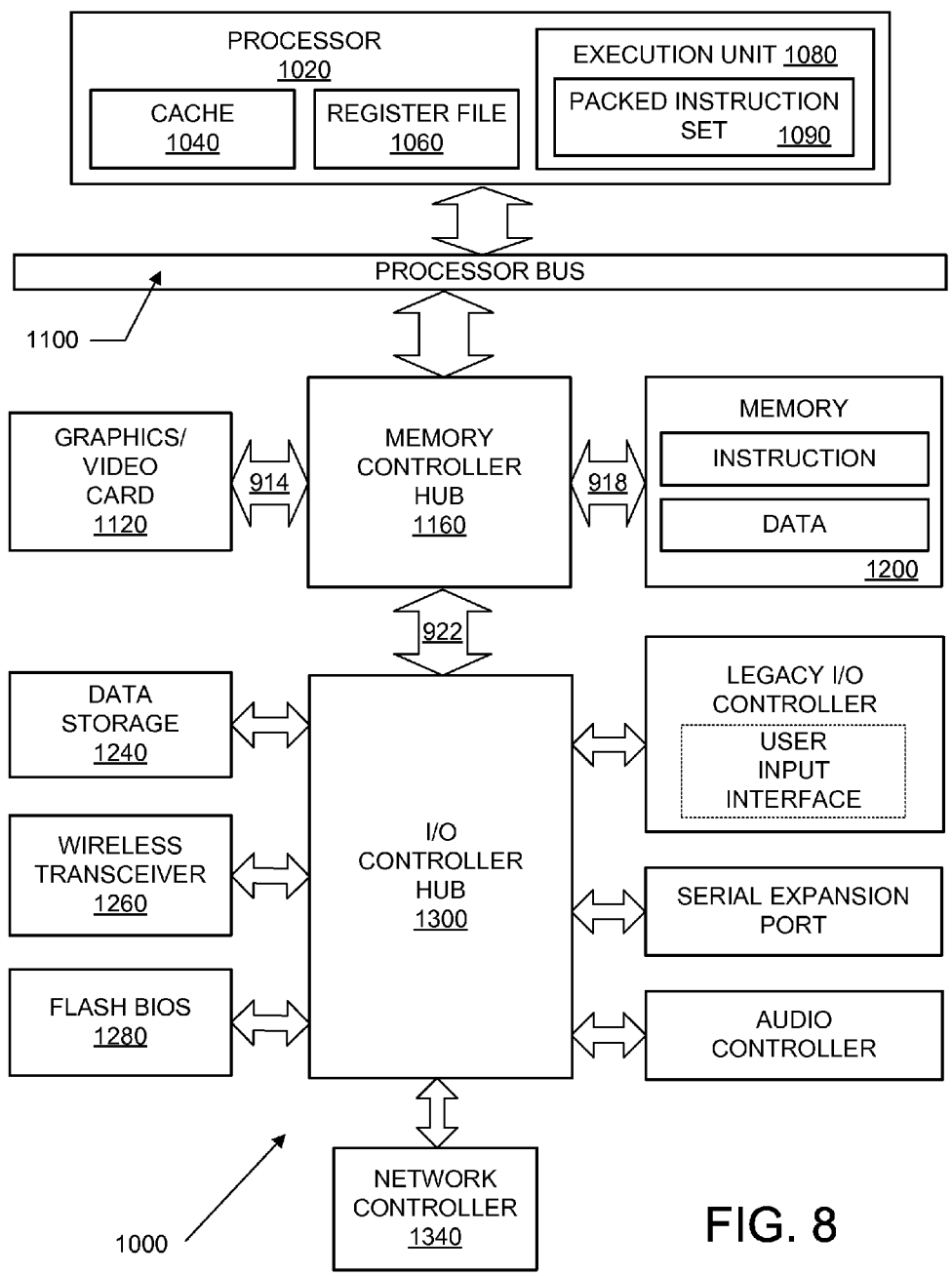
FIG. 8 is a block diagram illustrating a system for MOV elimination according to an example embodiment of the present invention.

FIG. 8 is a block diagram of an exemplary computer system 1000 formed with a processor that performs MOV elimination in accordance with one embodiment of the present invention. System 1000 includes a component, such as a processor 1020 to employ execution units including logic to perform algorithms for MOV elimination in accordance with the example embodiments above. In one embodiment, the system 1000 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In FIG. 8, the processor 1020 includes one or more execution units 1080 to perform MOV elimination in accordance with one embodiment of the present invention. One embodiment may be described in the context of a single processor desktop or server system, but alternative embodiments can be included in a multiprocessor system. System 1000 is an example of a 'hub' system architecture. The computer system 1000 includes a processor 1020 to process data signals. The processor 1020 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1020 is coupled to a processor bus 1100 that can transmit data signals between the processor 1020 and other components in the system 1000. The elements of system 1000 perform their conventional functions that are well known to those familiar with the art.

In one embodiment, the processor 1020 includes a Level 1 (L1) internal cache memory 1040. Depending on the architecture, the processor 1020 can have a single internal cache or multiple levels of internal cache. Alternatively, in another embodiment, the cache memory can reside external to the processor 1020. Other embodiments can also include a combination of both internal and external caches depending on the particular implementation and needs. Register file 1060 can store different types of data in various registers including integer registers, floating point registers, status registers, and instruction pointer register.

Execution unit 1080, including logic to perform integer and floating point operations, also resides in the processor 1020. The processor 1020 also includes a microcode (ucode) ROM that stores microcode for certain macroinstructions. For one embodiment, execution unit 1080 includes logic to handle a packed instruction set 1090. By including the packed instruction set 1090 in the instruction set of a general-purpose processor 1020, along with associated circuitry to execute the instructions, the operations used by many multimedia applications may be performed using packed data in a general-purpose processor 1020. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 1080 can also be used in micro controllers, embedded processors, graphics devices, DSPs, and other types of logic circuits. System 1000 includes a memory 1200. Memory 1200 can be a dynamic random access memory (DRAM) device, a static random access memory (SRAM) device, flash memory device, or other memory device. Memory 1200 can store instructions and/or data represented by data signals that can be executed by the processor 1020.

A system logic chip 1160 is coupled to the processor bus 1100 and memory 1200. The system logic chip 1160 in the illustrated embodiment is a memory controller hub (MCH). The processor 1020 can communicate to the MCH 1160 via a processor bus 1100. The MCH 1160 provides a high bandwidth memory path 918 to memory 1200 for instruction and data storage and for storage of graphics commands, data and textures. The MCH 1160 is to direct data signals between the processor 1020, memory 1200, and other components in the system 1000 and to bridge the data signals between processor bus 1100, memory 1200, and system I/O 1220. In some embodiments, the system logic chip 1160 can provide a graphics port for coupling to a graphics controller 1120. The MCH 1160 is coupled to memory 1200 through a memory interface 918. The graphics card 1120 is coupled to the MCH 1160 through an Accelerated Graphics Port (AGP) interconnect 914.

System 1000 uses a proprietary hub interface bus 922 to couple the MCH 1160 to the I/O controller hub (ICH) 1300. The ICH 1300 provides direct connections to some I/O devices via a local I/O bus. The local I/O bus is a high-speed I/O bus for connecting peripherals to the memory 1200, chipset, and processor 1020. Some examples are the audio controller, firmware hub (flash BIOS) 1280, wireless transceiver 1260, data storage 1240, legacy I/O controller containing user input and keyboard interfaces, a serial expansion port such as Universal Serial Bus (USB), and a network controller 1340. The data storage device 1240 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Although the above examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Figure 9:
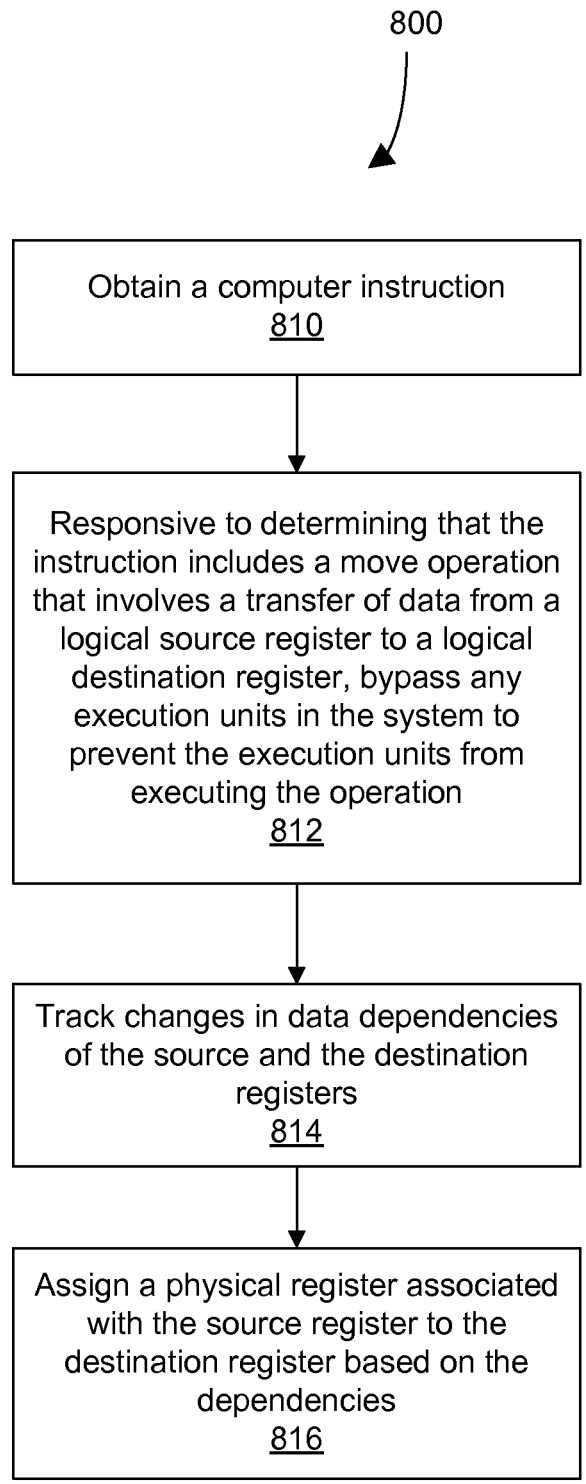
FIG. 9 is a flow chart of a method for MOV elimination according to an example embodiment of the present invention.

FIG. 9 is a flow chart of a method 800 according to an example embodiment of the present invention. The method 800 may be include data or instructions that, when executed by a processor, cause the processor to perform MOV elimination in accordance with the embodiments described above.

At 810, a computer instruction is obtained.

At 812, responsive to determining that the instruction includes a move operation that involves a transfer of data from a logical source register to a logical destination register, any execution units in the system are bypassed to prevent the execution units from executing the operation.

At 814, changes in data dependencies of the source and the destination registers are tracked.

At 816, a physical register associated with the source register is assigned to the destination register based on the dependencies, thereby performing the transfer of data without using the execution units.

In the preceding specification, the present invention has been described with reference to specific example embodiments thereof. It will, however, be evident that various modifications and changes may be made thereunto without departing from the broader spirit and scope of the present invention as set forth in the claims that follow. The embodiments described herein may be presented combined with each other in various combinations. The specification and drawings are accordingly to be regarded in an illustrative rather than restrictive sense.

What is claimed is:

1. A computer system that is configured to perform the following:
   obtaining a computer instruction;
   responsive to determining that the instruction includes a move operation that involves a transfer of data from a logical source register to a logical destination register, bypassing any execution units in the system to prevent the execution units from executing the operation; and
   performing the transfer of the data by:
      tracking changes in data dependencies of the source and the destination registers using a dependency table that directly shows dependencies between logical registers and is indexed by logical register, and
      assigning a physical register associated with the source register to the destination register based on the dependencies.

2. The computer system of claim 1, wherein:
   the system includes a renaming table containing pointers to the physical registers; and
   the assigning of the physical register is performed by assigning a pointer associated with the source register to the destination register.

3. The computer system of claim 2, wherein the pointers to the physical registers include speculative pointers that point to physical registers containing speculative copies of data, as well as architectural pointers that point to physical registers containing architectural copies of data.

4. The computer system of claim 3, wherein the system is configured to:
when the instruction's existing speculative pointer is updated, change the instruction's architectural pointer to point to the same location as the updated speculative pointer when the instruction is retired.

5. The computer system of claim 1, wherein the dependency table is a two-dimensional symmetric matrix having rows representing a set of logical registers and columns representing the same set of logical registers.

6. The computer system of claim 1, wherein the dependencies are updated when the instruction is retired by combining the destination register's current dependency on the source register with any existing dependencies of the source register, and updating the dependency table to include the combined dependencies.

7. The computer system of claim 6, wherein the system is configured to, when the instruction is retired, reference the dependency table to determine whether a physical register previously assigned to the destination register is currently assigned to another logical register.

8. The computer system of claim 7, wherein in response to determining that the previously assigned physical register is not currently assigned to another logical register, the system makes the previously assigned physical register available for assignment to logical registers of subsequently obtained instructions.

9. The computer system of claim 7, wherein in response to determining that the previously assigned physical register remains assigned to another logical register, the system prevents the previously assigned physical register from being made available for assignment to logical registers of subsequently obtained instructions.

10. A processor, comprising:
a decoder circuit configured to obtain a computer instruction;
a detection circuit configured to:
determine whether the instruction includes a move operation that involves a transfer of data from a logical source register to a logical destination register; and
flag the move operation for elimination in response to determining that the move operation involves a transfer of data from a logical source register to a logical destination register; and
a dependency tracking arrangement configured to:
track changes in data dependencies of the source and the destination registers using a dependency table that directly shows dependencies between logical registers and is indexed by logical register; and
assign a physical register associated with the source register to the destination register based on the dependencies.

11. The processor of claim 10, wherein the dependency tracking arrangement includes a renaming table containing pointers to the physical registers; and the dependency tracking arrangement assigns the physical register by assigning a pointer associated with the source register to the destination register.

12. The processor of claim 10, wherein the dependency table is a two-dimensional symmetric matrix having rows representing a set of logical registers and columns representing the same set of logical registers.

13. The processor of claim 10, wherein the dependencies are updated when the instruction is retired by combining the destination register's current dependency on the source register with any existing dependencies of the source register, and updating the dependency table to include the combined dependencies.

14. The processor of claim 13, wherein the dependency tracking arrangement is configured to, when the instruction is retired, reference the dependency table to determine whether a physical register previously assigned to the destination register is currently assigned to another logical register.

15. The processor of claim 14, wherein in response to determining that the previously assigned physical register is not currently assigned to another logical register, the dependency tracking arrangement makes the previously assigned physical register available for assignment to logical registers of subsequently obtained instructions.

16. The processor of claim 14, wherein in response to determining that the previously assigned physical register remains assigned to another logical register, the dependency tracking arrangement prevents the previously assigned physical register from being made available for assignment to logical registers of subsequently obtained instructions.

17. A computer-implemented method, comprising:
at a processor, obtaining a computer instruction;
responsive to determining that the instruction includes a move operation that involves a transfer of data from a logical source register to a logical destination register, bypassing any execution units in the processor to prevent the execution units from executing the operation; and
performing the transfer of the data by:
tracking changes in data dependencies of the source and the destination registers, using a dependency table that directly shows dependencies between logical registers and is indexed by logical register, and
assigning a physical register associated with the source register to the destination register based on the dependencies.

18. The method of claim 17, wherein:
the processor includes a renaming table containing pointers to the physical registers; and
the assigning of the physical register is performed by assigning a pointer associated with the source register to the destination register.

19. The method of claim 18, wherein the pointers to the physical registers include speculative pointers that point to physical registers containing speculative copies of data, as well as architectural pointers that point to physical registers containing architectural copies of data.

20. The method of claim 19, further comprising:
when the instruction's existing speculative pointer is updated, changing the instruction's architectural pointer to point to the same location as the updated speculative pointer when the instruction is retired.

21. The method of claim 17, wherein the dependency table is a two-dimensional symmetric matrix having rows representing a set of logical registers and columns representing the same set of logical registers.

22. The method of claim 17, further comprising:
updating the dependencies when the instruction is retired by combining the destination register's current dependency on the source register with any existing dependencies of the source register, and updating the dependency table to include the combined dependencies.

23. The method of claim 22, further comprising:
when the instruction is retired, referencing the dependency table to determine whether a physical register previously assigned to the destination register is currently assigned to another logical register.

24. The method of claim 23, further comprising:
in response to determining that the previously assigned physical register is not currently assigned to another logical register, making the previously assigned physical register available for assignment to logical registers of subsequently obtained instructions.

25. The method of claim 23, further comprising:
in response to determining that the previously assigned physical register remains assigned to another logical register, preventing the previously assigned physical register from being made available for assignment to logical registers of subsequently obtained instructions.

* * * * *